Oct. 29, 1957
J. BAUDE
2,811,678
CONTROL SYSTEM EMPLOYING A THERMAL RELAY
COORDINATED WITH CIRCUIT BREAKERS
Filed Dec. 6, 1952
4 Sheets-Sheet 1
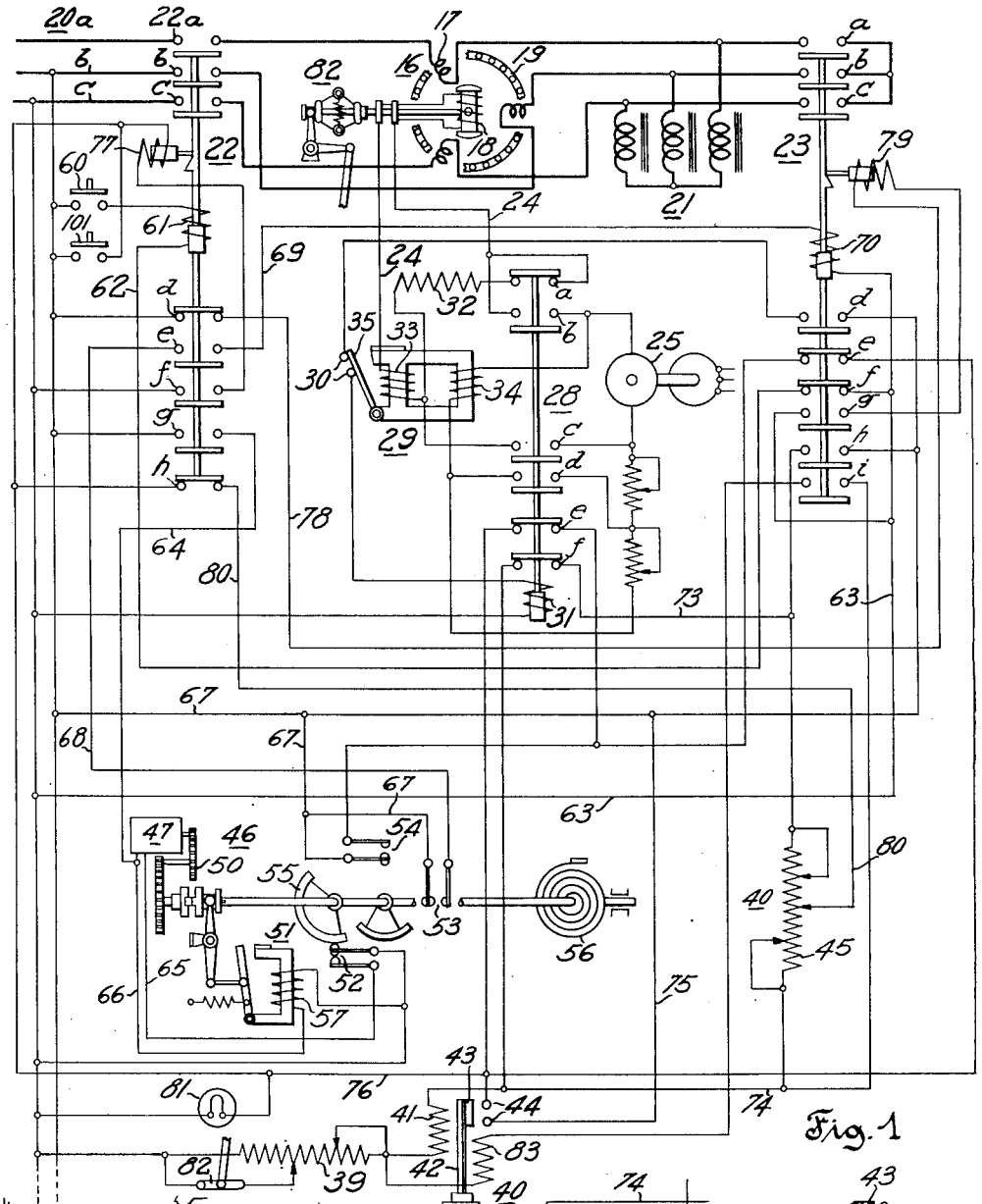
Fig. 1
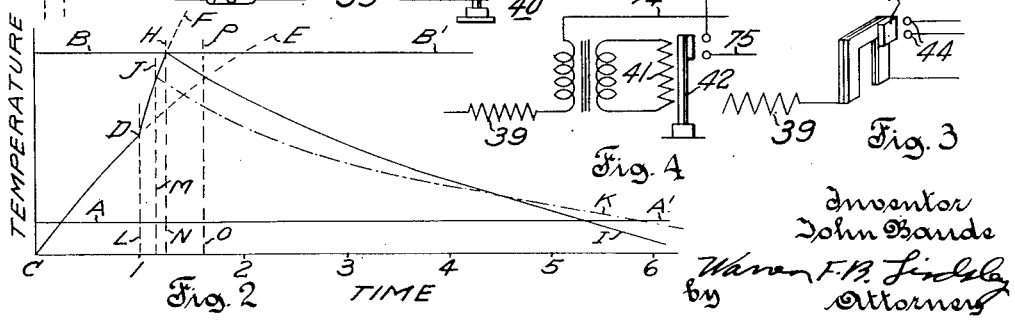
Fig. 2
Fig. 3
Fig. 4
Inventor
John Baude
by Warren F.B. Lindsley
Attorney

United States Patent Office 2,811,678
Patented Oct. 29, 1957

2,811,678

CONTROL SYSTEM EMPLOYING A THERMAL RELAY COORDINATED WITH CIRCUIT BREAKERS

John Baude, Milwaukee, Wis., assignor to Allis-Chalmers Manufacturing Company, Milwaukee, Wis.

Application December 6, 1952, Serial No. 324,546

12 Claims. (Cl. 317—132)

This invention relates to control arrangements and devices for electrical equipment and particularly to systems and devices for controlling the connections of an alternating current machine so as to protect it against predetermined abnormal conditions. More particularly this invention relates to control devices for protecting a secondary winding of an alternating current motor, such as a squirrel cage winding of a synchronous motor, from becoming overheated by the currents induced therein when the motor is operating subsynchronously.

Heretofore an attempt has been made to protect synchronous motors by thermal relays which lock the motor out should synchronization fail to occur within a definite time after starting. The time characteristic of this type of relay had to be such that the motor would have time enough to start both at reduced voltage and at full voltage. As a result of the relatively long time setting of the thermal relay for reduced voltage starting, the synchronous motor cage winding remained unprotected under conditions of pull out because the cage winding can operate under full voltage operating conditions only a very short time without overheating.

In order to illustrate the problem with a specific example, assume that a synchronous motor operating at fifty percent of normal voltage can use its cage winding for approximately one minute without overheating it. Since the heating of the cage winding varies with the square of the voltage, the same motor can operate only one-fourth of this time, or fifteen seconds at full voltage. It is obvious then that a relay which functions to protect the cage winding under all conditions and still permits sufficient time for starting on both reduced voltage and full voltage will have to be a relay which has not an invariable time characteristic, but which has a time characteristic which is adjustable to be coordinated with the magnitude of the voltage applied to the motor terminals.

In accordance with this invention, new and improved control systems and devices are provided by which the characteristics of a thermal relay are changed on a coordinate basis with primary circuit breaker operations to simulate the effect of motor terminal voltage variations. A means is provided which is cut in or out of the heater coil circuit of a thermal relay depending upon the circuit breaker position. These new and improved control arrangements and devices for starting synchronous machines are provided so that the thermal relay and associated equipment are correlated with the rates of heating and cooling of a secondary winding, such as the cage winding of a synchronous motor, to determine whether or not the motor control arrangement can respond to another motor starting operation.

It is therefore one object of this invention to provide a new and improved thermal relay.

Another object of this invention is to provide a new and improved thermal relay for controlling a plurality of circuit breaker structures.

A further object of this invention is to provide a lockout arrangement which disconnects a synchronous machine from a source of power in case abnormal conditions existed during the starting period.

A further object of this invention is to provide a new and improved control arrangement correlated with the connections of an alternating current motor so as to protect the motor against predetermined abnormal conditions.

A still further object of this invention is to provide a new and improved control arrangement for an alternating current motor in which the motor is deenergized in the event that the motor heats up and exceeds a predetermined temperature after starting power is applied and in which the motor is maintained deenergized a length of time correlated with the rate of cooling of its secondary winding.

Another object of this invention is to provide a new and improved control arrangement for starting a synchronous motor in which the motor is protected against restarting unless its cage winding has cooled to a predetermined temperature.

Another object of this invention is to provide a new and improved control arrangement for starting a synchronous motor in which the anticipated temperature of the cage winding governs the number of motor starting operations within a set time.

Objects and advantages other than those set forth will be apparent from the following descriptions when read in connection with the accompanying drawing, in which:

Fig. 1 is a diagrammatic view of a synchronous motor and a control thermal relay therefor embodying the present invention;

Fig. 2 is a graph showing the operating characteristics of the thermal relay illustrated in Fig. 1;

Figure 5:
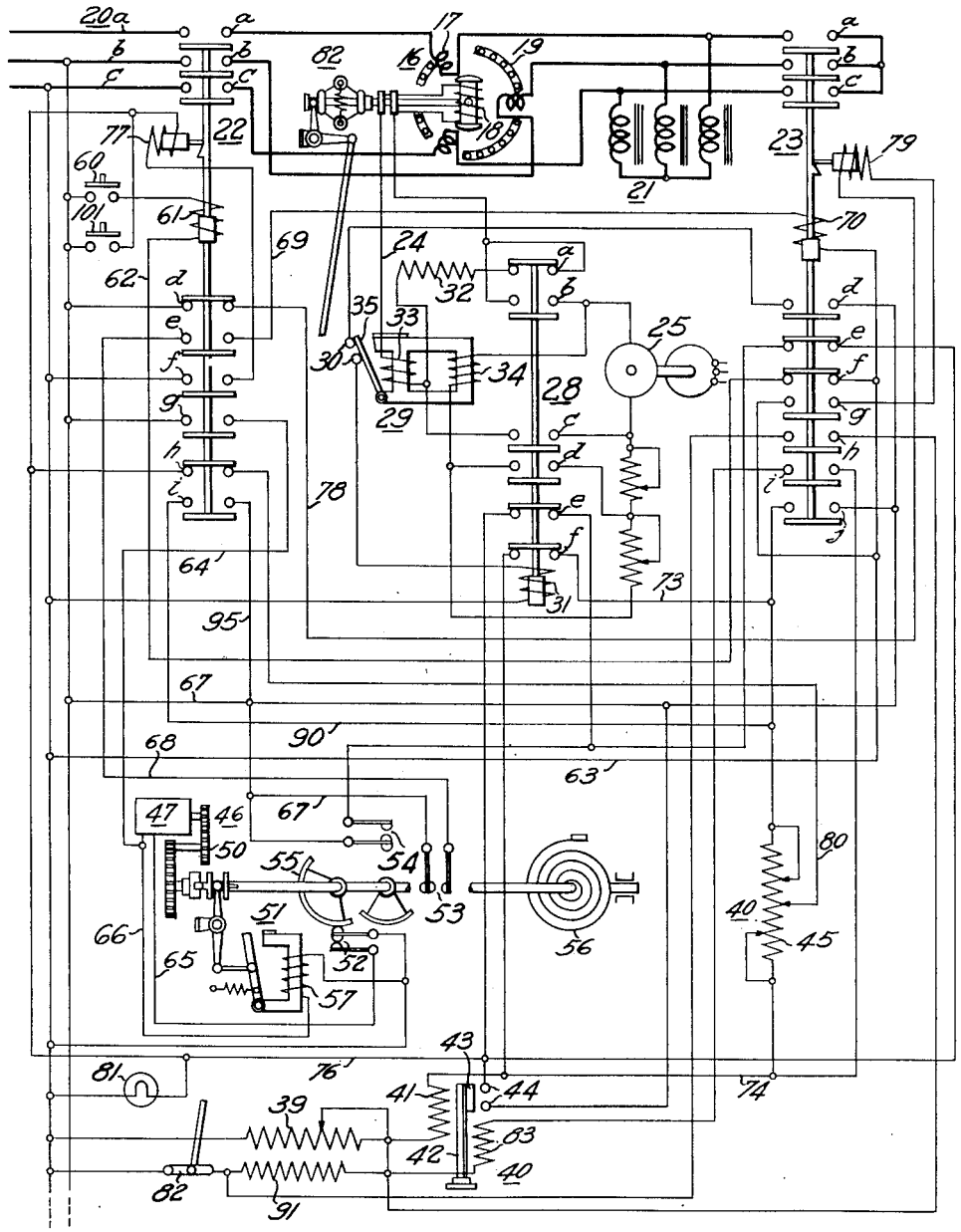
Figure 7:
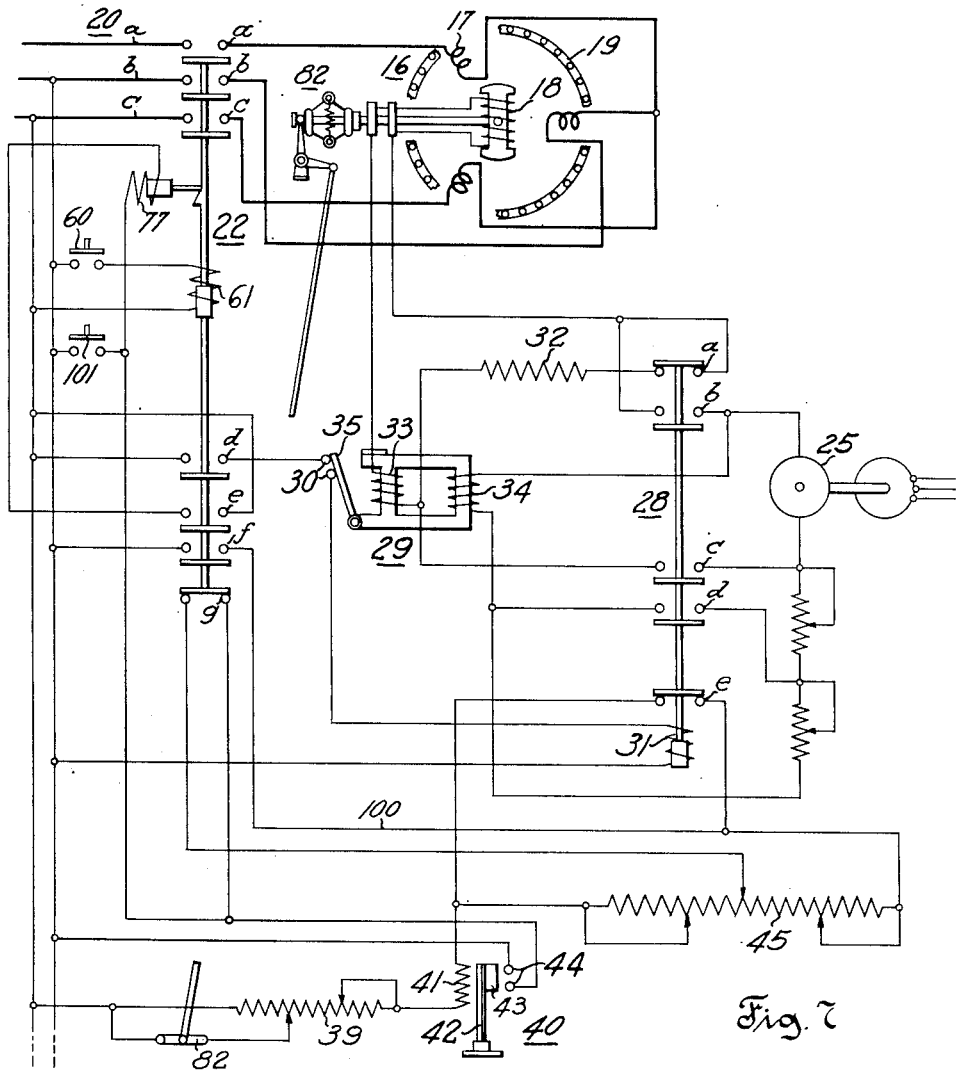
Figure 6:
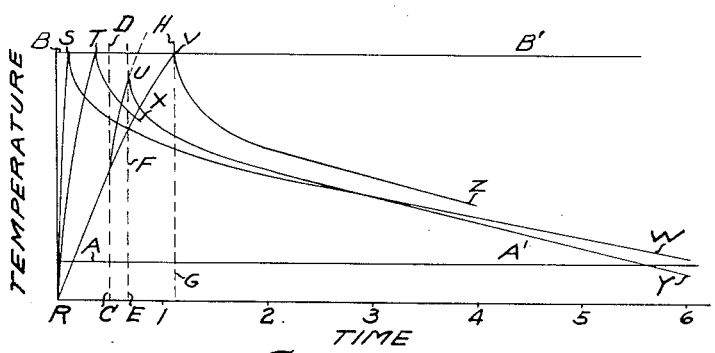
Figure 8:
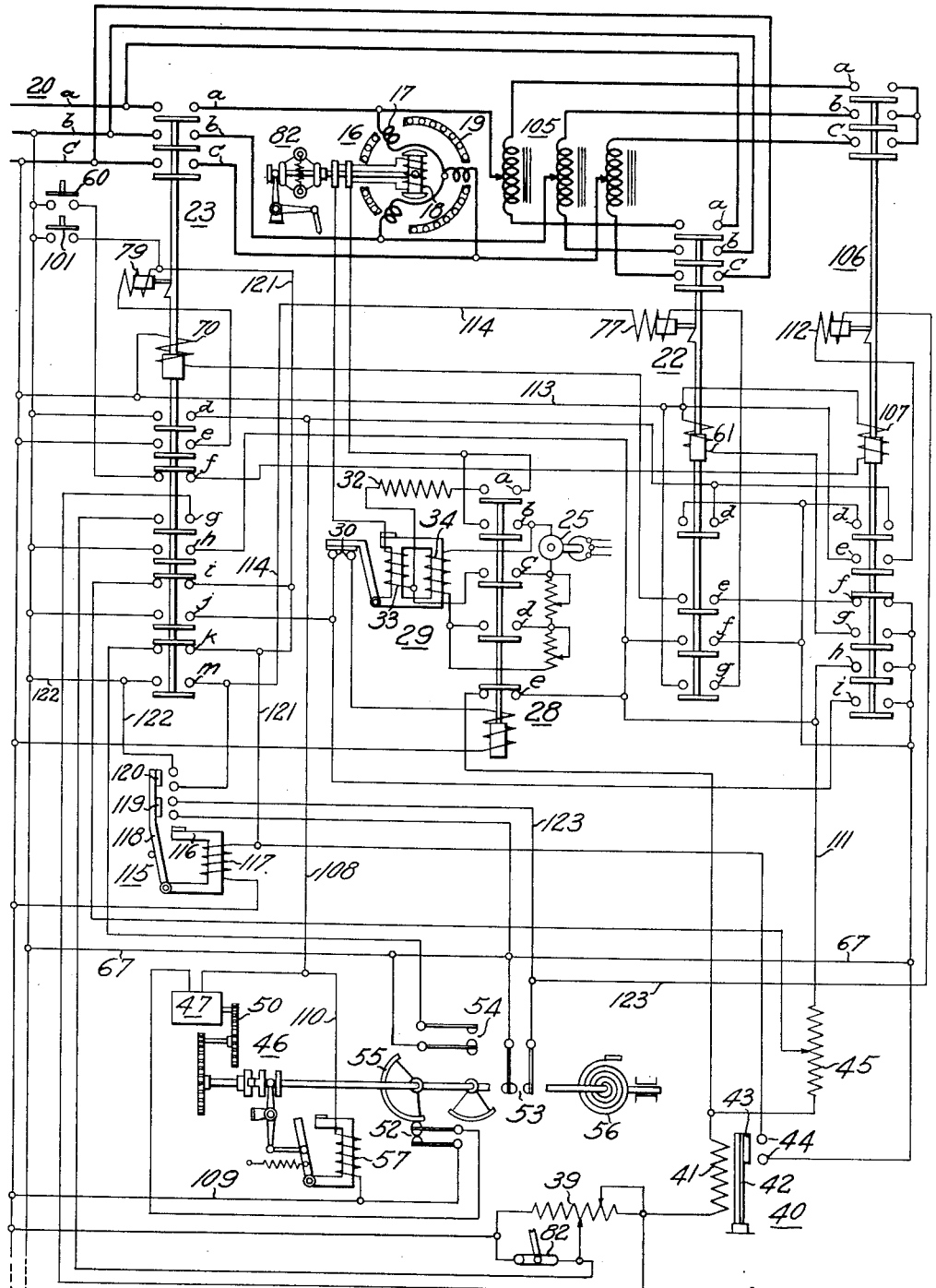

Fig. 3 partially illustrates diagrammatically a modification of Fig. 1 wherein the bimetallic element and heater of the thermal relay structure is a unitary device with the current flowing through the bimetallic element;

Fig. 4 illustrates diagrammatically a modification of the system of Fig. 1 wherein the heater of the thermal relay structure is connected across the secondary winding of a transformer;

Fig. 5 illustrates diagrammatically a modification of the system of Fig. 1 wherein the thermal relay is connected to start heating at the instant that the starting breaker is closed;

Fig. 6 is a graph showing the operating characteristics of the thermal relay illustrated in Fig. 5;

Fig. 7 illustrates diagrammatically a modification of the control arrangement shown in Fig. 5; and Fig. 8 illustrates diagrammatically a further modification of the control arrangement shown in Fig. 1.

Referring more particularly to the drawing by characters of reference, Fig. 1 illustrates an alternating current machine such as a synchronous motor 16 having an armature or primary winding 17, a field or secondary winding 18, and another secondary or squirrel cage winding 19. The synchronous motor 16 is connected to a suitable source 20 of current, such as sixty cycle alternating current, indicated by conductors 20a, 20b and 20c, through connections including a starting reactor 21 and circuit breakers 22 and 23, which may be referred to as starting and running breakers, respectively. The field winding 18 is connected in series with a field discharge resistor 32 in a circuit 24 by a normally closed contact 28a of the field contactor or breaker 28. An exciter 25 may be driven from synchronous motor 16 or may be driven, as shown, by a separate motor and is used for exciting the field winding 18. The field winding 18 is connected to and disconnected from the exciter 25 by means of contacts 28b and 28c of the field contactor or breaker 28. Contactor 28 is controlled by means of a field application relay 29, which has contacts 30 in circuit with a coil 31 of the contactor 28.

Field application relay 29 is a simple, rugged device operable to close contacts 30 after acceleration of motor 16, when the frequency and magnitude of the induced current in field winding 18 have diminished to the desired values. Relay 29 has a winding 33 which is energized with a current proportional to the current in field winding 18. A coil 34 provides a substantially constant flux component in one direction through the core of relay 29, by reason of the energization of coil 34 from a substantially constant voltage direct current source, such as the exciter 25. Armature 35 is operatively responsive to the sum of the fluxes produced by coils 33 and 34. A detailed description of this particular field application relay 29 may be found in the United States Patent No. 2,478,693, W. J. Herziger, dated August 9, 1949.

For protecting the starting reactor 21 of synchronous motor 16 from overheating during times of excessive starting duty, a new and improved heat responsive element or thermal relay 40 is provided. This thermal relay 40 may have other useful applications but is particularly useful for protecting the starting or cage winding 19 of machine 16 from overheating due to overloads or unsuccessful starts, pull outs, and too frequent starts. The protection afforded by relay 40 is based upon correlated time characteristics of the new relay 40 for simulating heating and cooling of the cage winding 19 of motor 16.

The thermal relay 40 comprises a current adjusting resistor 39, a heater 41, a bimetallic element 42, a movable contact 43 mounted on the movable end of the bimetallic element 42, stationary contacts 44, and another resistor 45 which is arranged to vary the current in the heater 41.

A motor driven transfer or timing device 46 is used to control the operation of synchronous motor 16 and comprises a motor 47, a gear train 50, an electromagentic relay 51, contacts 52, 53 and 54, cams or other suitable contact actuating means 55, and a timing device reversing spring 56.

Fig. 2 illustrates a time temperature curve of the operating conditions of the circuit breaker system illustrated in Fig. 1 wherein the horizontal line B, B¹ represents the temperature reached by cage winding 19 when the thermal relay locks out, and the horizontal line A, A¹ represents the temperature to which the cage winding has cooled when the thermal relay resets. Bimetallic strip 42 is built in any suitable known maner so as to respond to temperature changes with a snap action and thereby lock out and reset at widely different temperatures as represented by lines AA¹ and BB¹. Curves CDE and CDF represent the cage winding temperature rise during starting conditions of motor 16. Curve HI represents the cage winding temperature with the motor motionless, and curve JK represents cage winding temperature with the motor operating at normal speed with its field winding excited. The vertical line LD represents the time at which the transfer or timing relay 46 operates. The vertical line MJ represents the time at which the field contactor 28 normally closes its contacts 28b and 28c, the line NH represents the time at which the thermal relay 40 locks out if contactor 28 has failed to operate, and the line OP represents the time at which the transfer or timing relay 46 locks out as explained below.

In accordance with the invention, the thermal relay synchronous motor protective system functions as follows:

Refer to Fig. 1 and assume that the motor 16 is at standstill and a starting push button switch 60 is closed. Current flows from conductor 20b through switch 60, the closing coil 61 of the starting breaker 22, a conductor 62, contacts 23f of the running breaker 23, conductor 63 and back to the power supply source conductor 20c, and the starting breaker 22 closes. The following action then occurs. The motor 16 starts to rotate and opens zero speed switch 82 connected across a part of resistor 39. The cage winding 19 and the reactor 21 start to heat up under the influence of the currents induced in the cage winding and in the field winding as indicated by curve CD in Fig. 2. The frequency of these currents, called slip frequency, is the same in both windings and gradually decreases as the motor speeds up. The intensity of the cage winding current gradually decreases in time, so that the heating of the cage winding is roughly the same during each cycle of slip frequency current.

Current induced in the field winding 18 of motor 16 is circulated through a closed circuit comprising the field winding 18, contacts 28a of field breaker 28, the field discharge resistor 32, and the field application relay coil 33. The armature 35 of the field application relay 29 is attracted to the relay's iron core and by its movement opens contacts 30, and the contacts 30 remain open until the induced current frequency in the field winding circuit has decreased to a predetermined value.

Upon the closure of starting breaker 22 a current flows from the source 20b through contacts 22g, conductor 64, timing motor 47, conductor 65, contacts 52, and back to the alternating current source 20c. Current also flows from conductor 64 through conductor 66, the coil 57 of clutch 51 and back to the alternating current source 20c. This circuit energizes clutch 51 which causes the engagement of the gear train 50 and the contact actuating means 55. The gear train 50 rotates the contact actuating means 55 counterclockwise against the action of the spring biasing means 56. After a predetermined rotation of motor 47 and of the contact actuating means 55 the timer 46 closes its contacts 53 and current then flows from the source 20b, through conductor 67, contacts 53, conductor 68, contacts 22e of starting breaker 22, conductor 69, closing coil 70 of running breaker 23 and conductor 63 to the alternating current source 20c. Upon the energization of closing coil 70 the running breaker 23 closes its contacts 23a, 23b and 23c, thereby short circuiting the reactor 21. Motor 16 and particularly primary winding 17 is put under the influence of the full supply voltage, and cage winding 19 then heats up at an increased rate as indicated by curve DJ in Fig. 2.

Upon closure of running breaker 23, current flows from the source 20b, through a conductor 67, contacts 23h of the running breaker 23, conductor 73, contacts 28f of the field breaker 28, the heater coil 41 of the thermal relay 40 and resistor 39 back to the supply source 20c. This circuit through the field breaker contacts 28f and the heater 41 remains intact until field is applied to the synchronous motor or the thermal relay 40 is heated up to the point where its contacts 44 close under the influence of the heater coil 41. The motor continues to accelerate and when it reaches a predetermined speed slightly lower than its synchronous speed relay 29 closes contacts 30 to close a circuit from source 20b, conductor 67, contacts 23d, contacts 30, closing coil 31 of contactor 28 to source 20c. Contactor 28 connects field winding 18 to exciter 25 to synchronize motor 16. Cage winding 19 then cools as indicated by curve JK.

When the field is applied to synchronous motor 16 by the operation of field breaker 28, a reduced current flows through the heater coil 41 of the thermal relay 40 which keeps the bimetallic strip or element 42 from cooling faster than the cage winding of the synchronous machine, which cools off as indicated by curve JK. The intensity of this current used for reducing the cooling rate of the thermal relay 40 is adjusted by means of resistor 45 which is in shunt connection with contacts 28f of the field breaker 28.

After operation of the field breaker 28 to close its contacts 28b and 28c, current flows from the source 20b, through conductor 67, through contacts 23h of running breaker 23, resistor 45, conductor 74, resistor or heater element 41, and back to the source of supply 20c. Resistor 45 and heater 41 are adjusted to have a combined resistance value which provides for action of the bimetallic element 42 of the thermal relay 40 in such a manner that the deflection position of this bimetallic strip 42 is coordinated with the cooling action of the cage winding of motor 16 under normal running conditions. Timing relay 46 continues to operate until cam 55 allows contacts 52 to open to deenergize motor 47. Clutch 51, however, remains energized, so that cams 55 are held stationary by motor 47 against the action of spring 56. Contacts 54 are thereby held closed.

The operating condition of relay 40 is indicated by the action of the indicating lamp 81. Lamp 81 is energized as follows: cage winding 19 reaches its limit temperature indicated by point H. If the field breaker 28 did not close its main contacts 28b and 28c in the proper time interval, relay 40 then closes its contacts 43, 44 and current flows from the source 20b, through conductor 67, conductor 75, contacts 43, 44 of thermal relay 40, a conductor 76, the indicating lamp 81 back to the source of supply 20c. Further, current flows from the source 20b, through conductor 67, conductor 75, contacts 43, 44 of thermal relay 40, conductor 76, trip coil 77 of starting breaker 22, contacts 22f of breaker 22 and back to the source 20c. The starting breaker 22 trips upon the energization of trip coil 77 and deenergizes motor 16. The running breaker 23 is also opened by the opening of starting breaker 22 and the closing of contacts 22d thereof. Upon the engagement of contacts 22d, current flows from the supply source 20b through contacts 22d, conductor 78, a trip coil 79 of running breaker 23, the contacts 23g of running breaker 23, conductor 63, and back to the supply source 20c. Upon the energization of trip coil 79, breaker 23 opens its contacts 23a, 23b and 23c and motor 16 comes to standstill. Coil 57 of clutch 51 is deenergized to disconnect cams 55 from gear train 50, and spring 56 returns cams 55 to the starting position shown.

After circuit breakers 22 and 23 have been tripped under the influence of the operation of contacts 43, 44 of the thermal relay 40 as just described, current still circulates through the heater 41 of relay 40 to provide the heat necessary to control the rate of deflection of the bimetallic element 42 so that the rate of cooling of element 42 simulates the rate of cooling of the cage winding of motor 16 when motionless, indicated by curve HI. Upon the opening of circuit breakers 22 and 23 by the action of contacts 43 and 44 of relay 40, current flows from the source 20b, through conductor 67, conductor 75, contacts 43, 44 of thermal relay 40, conductor 76, contacts 22h of starting breaker 22, a conductor 80, the tap of resistor 45, a conductor 74, heater 41, a part of resistor 39, switch 82 and back to source of supply 20c. The current flowing through the heater 41 retards the deflection of element 42 to a point where it simulates the cooling time of the cage winding when the motor is motionless.

When cage winding 19 has cooled off sufficiently, relay 40 has cooled to the point that its contacts 43, 44 disengage, the lamp 81 is deenergized which indicates to the operator the possibility of a new starting cycle of the motor, the system then being returned to the original condition shown. Before the contacts 43 and 44 separate one current flows through the heater 41. After the contacts 43 and 44 separate, lower current flows through the heater 41. Thus the value of the current flowing depends on the positions of the contacts 43 and 44 and the bimetallic element 42.

During starting, if running breaker 23 fails to operate before timer closes contacts 54, a circuit is established from source 20b through conductor 67, contacts 54, contacts 23e, conductor 76, trip coil 77, contacts 22f back to source 20c. Starting breaker 22 opens to shut down motor 16.

If the motor is running and pulls out of step, the alternating current component induced in the field circuit causes relay 29 to open contacts 30, thereby causing contactor 28 to return to the position shown. A circuit is then established from source 20b through conductor 67, contacts 54, contacts 28e, conductor 76, trip coil 77, contacts 22f back to source 20c to open starting breaker 22 and shut down motor 16. If automatic resynchronization is required after pull out, contacts 28e must be disconnected to prevent the tripping of the starting and running breakers by means of contacts of the field breaker.

If motor 16 fails to rotate in response to closure of breaker 22, switch 82 remains closed. In this manner the heating of relay 40 is increased to correspond to the heating of cage winding 19 while the rotor 18 is locked to shut down the system in the manner above set forth.

After the running breaker 23 has closed its main contacts 23a, 23b and 23c, motor 16 and its cage winding 19 are protected under pull out conditions in the same manner as during starting. Consequently, if automatic synchronization after pull out is desired, special pull out relays are not required and the operator can take advantage of the thermal capacity which is left in the cage winding for an immediate repeated start since the motor and cage winding are protected by the simulated action of the thermal relay 40.

Motor 16 is provided with a zero speed switch 82 which is used to cut out part of the resistance of resistor 39 upon starting of motor 16. Further, another heater coil 83 may be connected in series with part of heater 41, as shown, and in circuit with contacts 23i of running breaker 23 to provide a means for further changing the rate of deflection of bimetallic element 42. It is also within the scope of this invention to provide the bimetallic element 42 and the heater 41 as a unitary device as shown in Fig. 3 with the current flowing through the deflecting element of the relay 40.

If it is desired to shut down motor 16 manually this can be accomplished by closing push button 101 causing current to flow from the source 20b, through push button 101, trip coil 77, contact 22f of running breaker 22 and back to the source of supply 20c.

Fig. 4 illustrates another way in which the thermal relay 40 may be arranged wherein the heater 41 is placed across the secondary winding of a suitable transformer. As illustrated in Fig. 3, heater 41 shown in Fig. 4 may be combined with the bimetallic element 42.

Fig. 5 illustrates a variation of the control scheme illustrated in Fig. 1. In Fig. 5 the thermal relay is reconnected in such a way that heating of the thermal relay 40 starts at the instant that the starting breaker 22 is closed. This is accomplished by adding contact 22i to the starting breaker 22 and connecting the heater 41 from the source of power 20b through conductor 67, conductor 95, contacts 22i, conductor 90, resistor 45, conductor 74, heater 41, resistor 39 to the supply source 20c. The contact 23h of the running breaker is connected in series with the zero speed switch 82 and in parallel with a resistor 91. A contact 23j of the running breaker 23 is connected in parallel with contacts 22i of the starting breaker 22 to provide a connection for circulating a residual current through the thermal relay for controlling the rate of cooling of thermal device 40.

Electrical operation of the control scheme illustrated in Fig. 5 is essentially the same as previously described for the control scheme illustrated in Fig. 1 with the exception that the current flow through the thermal relay 40 is initiated by the contacts 22i of the starting breaker. The thermal relay 40 starts to heat immediately upon the closing of the starting breaker 22 and heats at a rate which is coordinated with the rate of heating of the cage winding 19 of motor 16. This rate of heating of cage winding 19 continues until the running breaker 23 closes and its auxiliary contacts 23h close and short circuit the resistor 91.

During the synchronous motor starting procedure, if the starting breaker 22 closes, the zero speed switch 82 at first stays closed, the field breaker 28 stays open and the running breaker 23 closes under the influence of the action of the motor driven timer 46. The resistor 91 which is connected in series with the zero speed switch is short circuited by the operation of contact 23h. Short circuiting resistor 91 causes the maximum current flow through the thermal relay 40 to reduce the time delay of the relay.

During the synchronous motor starting sequence, if the running breaker fails to close when its closing circuit is energized, and the transfer relay 46 functions properly, the thermal relay 40 heats until its contacts 43, 44 engage. Since the transfer relay 46 is equipped with contacts 54 which close to lock out the starting breaker 22 in case the whole starting procedure is unsuccessful, it is necessary that the time required to close contacts 54 be at least equal to the time required to close contacts 43, 44 of the thermal relay 40. In practice it is desirable to set the motor driven lockout contact 54 of the transfer relay 46 for somewhat longer time in order to avoid interference between thermal relay 40 and a motor driven transfer relay 46.

The conditions under which the thermal relay cools should be arranged to match the various possible operating conditions under which the cage winding of the synchronous machine, as well as the reactor, assumes normal operating temperatures after a starting period has elapsed, or after the machine is shut down and before it can be restarted. After completion of the starting cycle, a residual current is circulated through the thermal relay 40 for delaying the natural cooling of the thermal relay to the point where it will match the somewhat slower rate of cooling of the cage winding of the motor and the reactor. The cooling operation of relay 40 in this control system is similar to that of relay 40 in Fig. 1.

Since all three devices, namely the cage winding, the starting reactor and the thermal relay, heat up during the starting cycle, repeated attempts to restart the motor are accurately registered by the accumulated heat in the themal relay. Heating of the relay followed by insufficient cooling eventually builds up the temperature within the thermal relay to the point where it will lock out the motor. Therefore, a careless or inexperienced operator is fully protected against damaging the motor by repeated unsuccessful efforts to get it started. The thermal relay locks the starting breaker out for a period of approximately six to ten minutes, the time depending upon whether the rotor is still in rotation or is completely locked by an overload.

Fig. 6 illustrates a time temperature curve of the operating conditions of the circuit breaker system illustrated in Fig. 5 wherein the horizontal line B, B¹ represents the temperature reached by cage winding 19 when the thermal relay locks out, and the horizontal line A, A¹ represents the temperature to which the cage winding has cooled when the thermal relay resets. Curves RS, RT, RU and RV represent the cage winding temperature rise during starting condition of motor 16. Curve SW represents the cage winding temperature when the motor has full voltage to its terminals and it pulls out of step. Curve TX represents the cage winding temperature when the rotor is locked immediately upon being energized and the transfer relay 46 fails to operate. Curve UY represents the cage winding temperature with the motor operating at normal speed with its field winding excited. Curve VZ represents the cage winding temperature when the transfer relay is locked out, contacts 54 are engaged, and the running breaker fails to close. The vertical line CD represents the time at which the transfer relay 46 normally closes its contacts 53. The vertical line EF represents the time at which the field contact 28 normally closes its contacts 28e and 28d. The vertical line GH represents the time at which the transfer relay 46 normally closes its contacts 54.

Fig. 7 illustrates a modification of the control arrangement shown in Fig. 5. This modification illustrates a full voltage starting arrangement wherein the same reference characters have been used as in Fig. 5 for similar elements.

In this embodiment of the invention the running breaker 23 and the reactor 21 have been eliminated and control relay 40 is energized upon the closing of the starting breaker 22 which also functions as a running breaker. The operation of this control system is as follows: Upon closing the starting push button switch 60, current flows from conductor 20b through the push button switch 60, the closing coil 61 of breaker 22 to conductor 20c. Circuit breaker 22 closes and causes energization of the stator winding 17 of the synchronous motor 16. Current flowing through the stator winding 17 induces current in cage winding 19 and field winding 18. The synchronous motor 16 starts to rotate upon energization of stator winding 17, and induced current in the field winding starts to circulate through the discharge resistor 32 and the contacts 28a of the field contactor 28. Current also circulates from the source 20b through contacts 22f of breaker 22, conductor 100, contacts 28e of breaker 28, heating element 41 of thermal relay 40, resistor 39, zero speed switch 82 and back to conductor 20c. Under this operating condition, thermal relay 40 heats up rapidly until the zero speed switch 82 opens and reduces the circulating current through the heating element 41 to an amount which is adjusted to give sufficient time to synchronize motor 16. When the motor 16 nears synchronous speed, it is brought under the influence of the field application relay 29, the operation of which was previously described under Fig. 1.

Upon closure of contact 30d of relay 29, current flows from the source 20b through the closing coil 31, contacts 30 of relay 29, contacts 22d of breaker 22 and back to the source 20c. Energization of coil 31 closes the field contactor 28.

When the field contactor 28 closes, the current flow through the heater element 41 of the thermal relay 40 is reduced to coordinate the cooling of relay 40 with the cooling of the cage winding 19 of motor 16. Current flows from the source 20b through contacts 22f of breaker 22, conductor 100, resistor 45, which upon closing of contactor 28 is no longer short circuited by contacts 28e, heater element 41 of the thermal relay 40, resistor 39, and back to the source 20c. Resistors 45 and 39 and heater 41 are adjusted to have a combined resistance value which provides for action of the bimetallic element 42 of the thermal relay 40 in such a manner that the deflected position of this bimetallic strip 42 is coordinated with the cooling action of the cage winding of motor 16 under normal running conditions.

Motor 16 may be stopped by closing push button switch 101 which causes current to flow from the source 20b through push button switch 101, trip coil 77 and contacts 22e of the breaker 22, and back to the source 20c. Upon the energization of trip coil 77 circuit breaker 22 is actuated to interrupt the current flow to the primary winding 17 of the motor 16.

Motor 16 may be restarted at any time provided the thermal relay 40 has not reached that temperature at which contacts 43 and 44 engage.

If motor 16 has been successfully started but is pulled out of synchronism by a heavy load, contacts 30 open and the current flow through relay 40 is increased by the closing of contacts 28e of the field contactor 28. The closing of contacts 28e short circuits the resistor 45. Under this condition, current flows from the source 20b, through contacts 22f of breaker 22, contacts 28e of contactor 28, heating element 41 of thermal relay 40, resistor 39, and back to the source of supply 20c. In case the rotor of motor 16 locks in, in addition to pulling out of step, the zero switch 82 closes and current flow from 20b to 20c described above takes place through only part of resistor 39. By short circuiting part of resistor 39, the current is increased and the rate of heating of the thermal relay 40 is increased over the rate of heating during the pull out operation. If breaker 22 is not opened manually by operation of the push button switch 101 before the thermal relay 40 closes its contacts 43, 44, the thermal relay acts as a lockout device by closing contacts 43, 44 and current circulates from the source 20b through contacts 43, 44 of relay 40, trip coil 77, contacts 22e of breaker 22, and back to the source of supply 20c. After breaker 22 has been tripped open current still circulates from the source 20b through contacts 43, 44, contacts 22g, center tap of resistor 45, thermal element 41 of relay 40, resistor 39, zero speed switch 82, and back to the source of supply 20c. The cooling of relay 40 then is retarded in proportion to the current flowing through the heater element 41 until contacts 43 and 44 of relay 40 separate indicating that the thermal relay has fully reset. This resetting of relay 40 can be indicated by a lamp as shown in Fig. 5.

Fig. 8 illustrates a further modification of the control arrangement shown in Fig. 5. In this modification the reactor 21 of Fig. 5 is omitted and an autotransformer 105 is substituted therefor. Thermal relay 40 is controlled by starting breaker 22, running breaker 23 and a neutral breaker 106.

Upon closing of push button switch 60, current flows from the source 20b through push button switch 60, contacts 23f of the running breaker 23, closing coil 107 of the neutral breaker 106, and back to the source of supply 20c. After the neutral breaker 106 has closed, the starting breaker 22 closes by current flowing from the source of supply 20b through conductor 67, contacts 106g, closing coil 61 of starting breaker 22 and back to the source of supply 20c.

The instant the neutral breaker is closed, current flows from the source 20b, through conductor 67, contacts 106d of neutral breaker 106, conductor 108, motor 47 of timer 46, contacts 52 of timer 46, conductor 109 and back to the source of supply 20c. Current also flows from source 20b through contacts 106d, conductor 108, conductor 110, coil 57 of the electromagnetic relay 57, conductor 109, and to the source of supply 20c. The circuit through the motor 47 may be interrupted by contacts 52 in the manner previously described. Contacts 23d of running breaker 23 are connected in parallel with auxiliary contacts 22d of the starting breaker 22 and 106d of the neutral breaker 106. This parallel connection of contacts 22d, 23d, and 106d in series with the timing relay 46 assures continuous operation of the timing relay 46 under all operating conditions which are associated with the closing of any one of the circuit breakers 22, 23 and 106.

When the neutral breaker 106 closes current flows from the source of supply 20b, through conductor 67, contacts 106h of the neutral breaker 106, conductor 111, resistor 45, heating element 41 of thermal relay 40, resistor 39, zero speed switch 82 to the source of supply 20c. After the starting breaker 22 has closed in the manner previously described and motor 16 has come up to a speed which is sufficient to open the zero speed switch 82, the current through the thermal relay 40 is reduced by the additional resistance of resistor 39 which was cut into the circuit by opening of the zero speed switch 82. The current flow through the heater element 41 of thermal relay 40 is maintained until the field contactor 28 closes and opens its auxiliary contacts 28e. Contacts 28e when closed short circuit resistor 45 and upon opening insert resistor 45 in the heating circuit of thermal relay 40 to reduce the heater current as described.

Transfer from starting to running operation of motor 16 is accomplished by the contacts 53 of the timing relay 46 as follows. Upon closure of contacts 53 of timing relay 46 current flows from the source 20b, through conductor 67, contacts 53, trip coil 112 of neutral breaker 106, auxiliary contacts 106e of neutral breaker 106, conductor 113 and back to the source of supply 20c. The tripping of the neutral breaker 106 causes current to flow from the source 20b through conductor 67, contacts 106f of the neutral breaker 106, contacts 22e of the starting breaker 22, closing coil 70 of the running breaker 23, and back to the source of supply 20c. After the running breaker 23 has closed, the starting breaker 22 is tripped as follows. Current flows from the source 20b, through contacts 23m of running breaker 23, conductor 114, trip coil 77 of starting breaker 22, contacts 22g of breaker 22, conductor 113 and back to the source of supply 20c. After the starting breaker 22 has tripped, the field contactor 28 is closed by operation of the field frequency relay 29 as previously described. After the field contactor 28 has closed, the motor 16 is assumed to operate properly and can be taken off the line by pushing the trip push button switch 101 which causes current to flow from the source 20b, through trip coil 79 of the running breaker 23, through contacts 23e of the running breaker 23 and back to the source 20c.

To disconnect motor 16 from the source of power at any instant during the starting cycle, a tripping relay 115 comprising core 116, coil 117, armature 118, and contacts 119 and 120, is provided. Tripping relay 115 is arranged in the motor control scheme so that upon closing push button switch 101 before the running breaker 23 has closed, current will flow from the source 20b through push button switch 101, conductor 121, coil 117 of relay 115 and to the source of supply 20c. When the tripping relay 115 closes its contacts 119 and 120 by the actuation of armature 118 current flows from the source 20b, through conductor 122, contacts 120 of relay 118, conductor 114, trip coil 77 of starting breaker 22, contacts 22g of the starting breaker 22, conductor 113 and back to the source of supply 20c. Current also flows from the source 20b through conductor 67, contacts 119 of relay 115, conductor 123, trip coil 112 of neutral breaker 106, contacts 106e of neutral breaker 106, conductor 113 and back to the source of supply 20c. Thus, breakers 22 and 106 may be tripped before the running breaker 23 closes.

After the motor 16 has come up to synchronous speed and is operating properly, the cooling of the thermal relay 40 is controlled by residual current flowing through resistor 45 as heretofore described. Motor pull out conditions are controlled by this operating scheme in a manner similar to that described for Figs. 1 to 7.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, a circuit breaker connected to a source of electric power, a thermal device electrically connected to said breaker, means for closing said breaker to cause a first current to flow from said source through said breaker to said device, means for changing the resistance of said device for sequentially causing a second lower current to flow through said device, means for opening said breaker, said device upon reaching a predetermined temperature actuating said opening means to open said breaker, means actuated by said breaker upon movement to open position for connecting said device to said source to cause a third lower current to flow through said device to retard to a predetermined value the rate of cooling of said device.

2. In combination, a first circuit breaker connected to a source of electric power, a second circuit breaker connected to said source, a thermal relay electrically connected to said first and second breakers, relay means electrically connected to said second breaker, means for closing said first breaker to cause a first current to flow from said source through said first breaker to said relay, means for closing said second breaker upon a predetermined actuation of said relay means, means responsive to the closing of said second breaker for connecting said relay to said source to cause a second lower current to flow through said relay to retard to a predetermined value the rate of cooling of said relay.

3. In combination, a circuit breaker connected to a source of electric power, a thermal device electrically connected to said breaker, means for closing said breaker to cause a first current to flow from said source through said breaker to said device, means for opening said breaker, said device upon reaching a predetermined temperature actuating said opening means to open said breaker, means actuated by said breaker upon movement to open position for connecting said device to said source to cause a second lower current to flow through said device to retard to a predetermined value the rate of cooling of said device, said device upon cooling to a predetermined temperature disconnecting said opening means from said breaker and reconnecting said closing means to said breaker.

4. In combination, a first circuit breaker connected to a source of electric power, a second circuit breaker connected to said source, a thermal relay means electrically connected to said first and second breakers, means for closing said first breaker to cause a first current to flow from said source through said first breaker to said relay means, means for closing said second breaker upon a predetermined actuation of said relay means, means for opening said first and second breakers, said relay means upon reaching a predetermined temperature actuating said opening means to open said first and second breakers, means responsive to the opening of said second breaker for connecting said relay means to said source to cause a second lower current to flow through said relay means to retard to a predetermined value the rate of cooling of said relay means.

5. In combination, first and second circuit breakers connected to a source of electric power, a timing device electrically connected to said first breaker, a thermal relay electrically connected to said second breaker, means for closing said first breaker to cause a first current to flow from said source through said first breaker to actuate said device, means for closing said second breaker upon a predetermined actuation of said device, means for opening said first and second breakers, said second breaker upon closure thereof causing a first current to flow through said relay, said relay upon reaching a predetermined temperature actuating said opening means to open said first and second breakers, and means responsive to the opening of said first and second breakers for connecting said relay through said second breaker to said source to cause a second lower current to flow through said relay to retard to a predetermined value the rate of cooling of said relay.

6. In combination, a first circuit breaker, a second circuit breaker, said first and second circuit breakers being connected to a source of electric power, a timing device electrically connected to said first breaker, a thermal relay comprising a heat responsive element electrically connected to said second breaker, means for closing said first breaker to cause a first current to flow from said source through said first breaker to actuate said device, means for closing said second breaker upon a predetermined actuation of said device, said second breaker upon closure thereof causing a first current to flow through said relay, a third circuit breaker connected in an electric circuit between said second breaker and said element, means for actuating said third breaker to interrupt said first current flow through said element, and means upon actuation of said third breaker connecting said element to said source to cause a second lower current to flow through said element to lower to a predetermined value the rate of cooling of said element.

7. In combination, a first circuit breaker, a second circuit breaker, said first and second circuit breakers being connected to a source of electric power, a timing device electrically connected to said first breaker, a thermal relay comprising a heat responsive element electrically connected to said first and second breakers, means for closing said first breaker to cause a first current to flow from said source through said first breaker to actuate said device and said element, means for closing said second breaker upon a predetermined actuation of said device, said second breaker upon closure thereof causing a second current to flow through said element, a third circuit breaker connected in an electric circuit between said second breaker and said element, means for actuating said third breaker to interrupt said second current flow through said element, and means upon actuation of said third breaker connecting said element to said source to cause a third lower current to flow through said element to lower to a predetermined value the rate of cooling of said element.

8. In combination, a first circuit breaker, a second circuit breaker, said first and second circuit breakers being connected to a source of electric power, a timing device electrically connected to said first breaker, a thermal relay comprising a heat responsive element electrically connected to said first and second breakers, means for closing said first breaker to cause a first current to flow from said source through said first breaker to actuate said device and said element, means for closing said second breaker upon a predetermined actuation of said device, said second breaker upon closure thereof causing a second current to flow through said element, a third circuit breaker connected in an electric circuit between said second breaker and said element, and relay means electrically connected to said third breaker, means for actuating said third breaker to interrupt said second current flow through said element upon a predetermined condition of said relay means, and means upon actuation of said third breaker for connecting said element to said source to cause a third lower current to flow through said element to lower to a predetermined value the rate of cooling of said element.

9. In combination, a first circuit breaker, a second circuit breaker, said first and second circuit breakers being connected to a source of electric power, a timing device electrically connected to said first breaker, a thermal relay comprising a heat responsive element electrically connected to said first and second breakers, means for closing said first breaker to cause a first current to flow from said source through said first breaker to actuate said device and said element, means for changing the resistance of said element for sequentially causing a second lower current to flow through said element, means for closing said second breaker upon a predetermined actuation of said device, said second breaker upon closure thereof causing a third current to flow through said element, a third circuit breaker connected in an electric circuit between said second breaker and said element, and relay means electrically connected to said third breaker, means for actuating said third breaker to interrupt said third current flow through said element upon a predetermined condition of said relay means, and means upon actuation of said third breaker for connecting said element to said source to cause a fourth lower current to flow through said element to lower to a predetermined value the rate of cooling of said element.

10. In combination, a first circuit breaker, a second circuit breaker, said first and second circuit breakers being connected to a source of electric power, a timing device electrically connected to said first breaker, a thermal relay comprising a bimetallic element electrically connected to said second breaker, means for closing said first breaker to cause a first current to flow from said source through said first breaker to actuate said device, means for closing said second breaker upon a predetermined actuation of said device, said second breaker upon closure thereof causing a first current to flow through said element, a third circuit breaker connected in an electric circuit between said second breaker and said element, means for actuating said third breaker to interrupt said first current flow through said element, and means upon actuation of said third breaker for connecting said element to said source to cause a second lower current to flow through said element to lower to a predetermined value the rate of cooling of said element.

11. In combination, a first circuit breaker, a second circuit breaker, said first and second circuit breakers being connected to a source of electric power, a timing device electrically connected to said first breaker, a thermal relay comprising a heater and a bimetallic element electrically connected to said second breaker, means for closing said first breaker to cause a first current to flow from said source through said first breaker to actuate said device, means for closing said second breaker upon a predetermined actuation of said device, said second breaker upon closure thereof causing a first current to flow through said heater, a third circuit breaker connected in an electric circuit between said second breaker and said heater, means for actuating said third breaker to interrupt said first current flow through said heater, and means upon actuation of said third breaker for connecting said heater to said source to cause a second lower current to flow through said heater to lower to a predetermined value the rate of cooling of said element.

12. In combination, a circuit breaker connected to a source of electric power, a thermal device electrically connected to said breaker, means for closing said breaker to cause a first current to flow from said source through said breaker to said device, an indicating lamp electrically connected to said device, means for opening said breaker, said device upon reaching a predetermined temperature actuating said opening means to open said breaker and connect said lamp across said source of power, means actuated by said breaker upon movement to open position for connecting said device to said source to cause a second lower current to flow through said device to retard to a predetermined value the rate of cooling of said device, said device upon cooling to a predetermined temperature disconnecting said opening means from said breaker and said lamp from said source.

References Cited in the file of this patent

UNITED STATES PATENTS

| | | |
|---|---|---|
| 1,805,492 | MacMillan | May 19, 1931 |
| 2,346,592 | Lehane | Apr. 11, 1944 |
| 2,384,372 | Eaton | Sept. 4, 1945 |
| 2,498,127 | Kuhn | Feb. 21, 1950 |
| 2,539,206 | Robinson | Jan. 23, 1951 |
| 2,607,831 | Jones | Aug. 19, 1952 |

FOREIGN PATENTS

| | | |
|---|---|---|
| 456,469 | Great Britain | Nov. 10, 1936 |